US 008593086B2

(12) United States Patent
Hay et al.

(10) Patent No.: US 8,593,086 B2
(45) Date of Patent: Nov. 26, 2013

(54) SYSTEM AND METHOD INCLUDING FEED-FORWARD CONTROL OF A BRUSHLESS SYNCHRONOUS MOTOR

(75) Inventors: Kevin Hay, Des Moines, WA (US); Brian Guglielmetti, Lake Tapps, WA (US)

(73) Assignee: OMAX Corporation, Kent, WA (US)

( * ) Notice: Subject to any disclaimer, the term of this patent is extended or adjusted under 35 U.S.C. 154(b) by 386 days.

(21) Appl. No.: 12/563,336

(22) Filed: Sep. 21, 2009

(65) Prior Publication Data

US 2010/0301794 A1    Dec. 2, 2010

Related U.S. Application Data

(63) Continuation-in-part of application No. 12/473,213, filed on May 27, 2009, now abandoned.

(51) Int. Cl.
*H02P 6/00* (2006.01)

(52) U.S. Cl.
USPC ............... 318/400.01; 318/400.14; 318/721; 318/799; 318/266; 318/466; 318/685; 318/696

(58) Field of Classification Search
USPC ........... 318/603, 605, 696, 685, 560, 400.01, 318/721, 280, 266, 282, 632, 652, 661, 318/400.4, 400.06, 400.07, 400.14, 799, 318/286, 466, 437; 700/56, 68, 58, 61, 114, 700/78, 302, 64; 702/94, 95, 96, 145; 417/290; 388/901
See application file for complete search history.

(56) References Cited

U.S. PATENT DOCUMENTS

| | | | | |
|---|---|---|---|---|
| 4,216,415 A * | 8/1980 | Shimonou et al. | ............ | 318/600 |
| 4,822,218 A * | 4/1989 | Satoh | ............ | 409/136 |
| 5,084,791 A * | 1/1992 | Thanos et al. | ............ | 360/77.04 |
| 5,249,161 A * | 9/1993 | Jones et al. | ............ | 367/83 |
| 5,831,403 A * | 11/1998 | Kanki et al. | ............ | 318/286 |
| 6,121,744 A * | 9/2000 | Hoda et al. | ............ | 318/685 |
| 6,870,346 B2 * | 3/2005 | Davidov | ............ | 318/685 |
| 6,879,415 B2 * | 4/2005 | Kurosawa | ............ | 358/474 |
| 7,035,708 B1 * | 4/2006 | Olsen | ............ | 700/160 |
| 7,386,262 B2 * | 6/2008 | Okamura et al. | ............ | 399/298 |
| 7,560,892 B2 * | 7/2009 | Shibasaki et al. | ............ | 318/685 |
| 7,917,017 B2 * | 3/2011 | Kanamori | ............ | 388/811 |
| 2007/0267996 A1 * | 11/2007 | Shibasaki et al. | ............ | 318/696 |
| 2009/0272245 A1 | 11/2009 | Voice et al. | | |
| 2009/0311944 A1 | 12/2009 | Olsen | | |

OTHER PUBLICATIONS

"Memory water jet milling", available from http://www.computescotland.com/memory-water-jet-milling-5236.php, Apr. 24, 2012, 4 pages.

* cited by examiner

*Primary Examiner* — Antony M Paul
(74) *Attorney, Agent, or Firm* — Perkins Coie LLP

(57) ABSTRACT

A drive system, such as for a fluid jet cutting system, includes a brushless synchronous motor configured to drive movement through a loosely coupled transmission, a sensor configured to sense movement, and a control system configured to drive the brushless synchronous motor responsive to previously measured drive coupling.

34 Claims, 8 Drawing Sheets

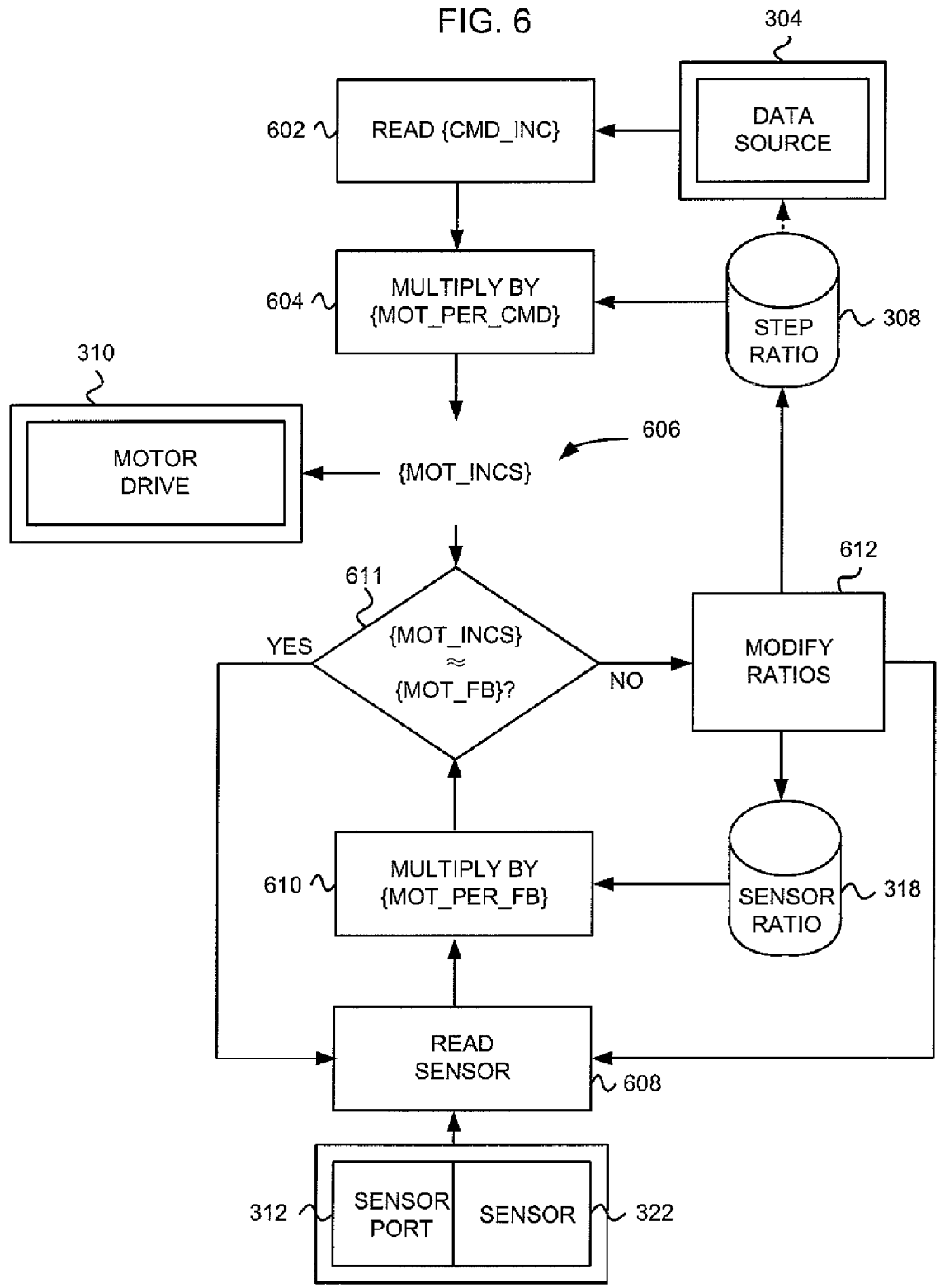

SYSTEM AND METHOD INCLUDING FEED-FORWARD CONTROL OF A BRUSHLESS SYNCHRONOUS MOTOR

CROSS REFERENCE TO RELATED APPLICATIONS

The present application is a continuation-in-part of copending U.S. patent application Ser. No. 12/473,213 filed May 27, 2009, entitled "SYSTEM AND METHOD INCLUDING FEED FORWARD CONTROL FOR DRIVING TRAVEL WITH A STEPPER MOTOR", invented by Kevin Hay and Brian Guglielmetti.

BACKGROUND

Machine systems such as fluid jet cutting systems have recently used friction drive systems with servo-loop controlled motors to move a cutting nozzle relative to a workpiece. Unfortunately, such servo-motors are expensive and require relatively expensive control circuitry.

SUMMARY

According to an embodiment, a fluid jet cutting system includes a brushless synchronous motor configured to move a cutting nozzle relative to a workpiece through a loosely-coupled drive arrangement such as a friction drive apparatus.

According to an embodiment, a friction drive system includes a brushless synchronous motor configured to drive a drive wheel, a sensor configured to sense actual movement produced by the drive wheel, and a feed-forward control system configured to vary the number of steps through which the brushless synchronous motor is driven according to observed coupling between the drive wheel and the sensor.

According to an embodiment, a brushless synchronous motor drive system includes a feedback system having a feedback resolution and a positioning resolution having a precision higher than the feedback resolution.

According to an embodiment, a method includes receiving an intended movement distance, determining a number of motor drive increments corresponding to the intended movement distance times a ratio, driving a brushless synchronous motor a distance corresponding to the number of motor drive increments, sensing an actual movement distance, and modifying the ratio if the actual movement distance is different than the intended movement distance.

BRIEF DESCRIPTION OF THE FIGURES

FIG. 6 is a flow chart illustrating a process for driving a brushless synchronous motor, according to an embodiment.

DETAILED DESCRIPTION

Figure 1:
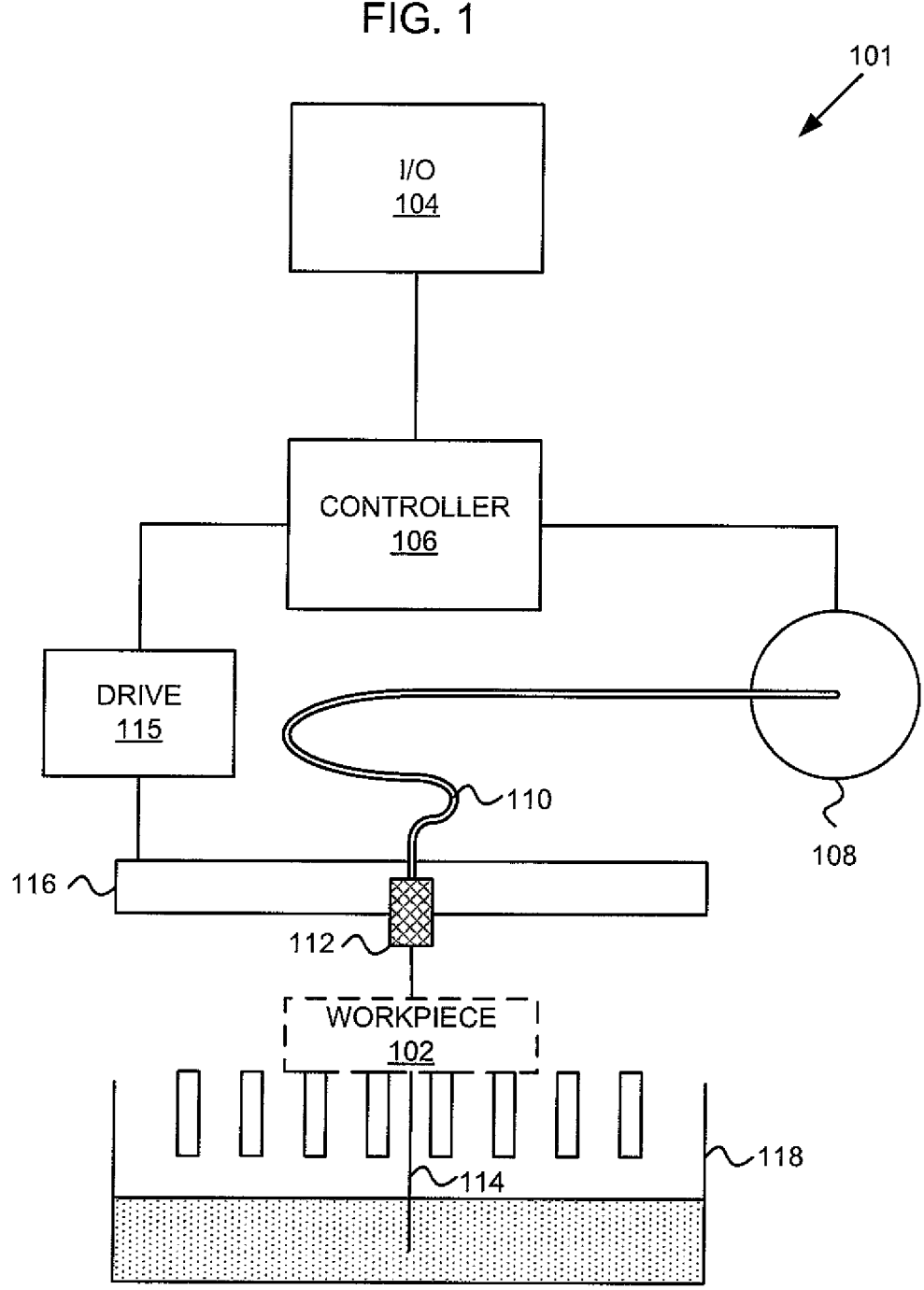
FIG. 1 is a diagram illustrating a fluid jet cutting system, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a diagram illustrating a fluid jet cutting system 101 configured to cut a workpiece 102, according to an embodiment. A computer interface 104 may be configured to receive computer instructions corresponding to a cutting path through the workpiece 102. Optionally, a system 101 may include a computer (not shown) configured to compute and transmit instructions to the interface 104. A controller 106 may be configured to receive the computer instructions to drive the fluid jet cutting system 101.

The controller 106 may be operatively coupled to a high pressure pump 108. The pump 108 may optionally be controlled separately. The high pressure fluid pump 108 is configured to provide high pressure fluid through high pressure tubing 110 to a nozzle 112. The nozzle 112 receives the high pressure fluid and projects a fluid cutting jet 114. The fluid in the cutting jet 114 may include substantially pure water, or alternatively may include entrained abrasive particles such as garnet from an abrasive supply system (not shown).

The controller 106 may be operatively coupled to an actuation drive controller 115. The actuation drive controller 115 may be configured to transmit control signals to an actuation system 116 configured to drive the position of the nozzle 112. A minimum actuation system 116 may include a single motion axis, for example for a cut off saw. Typically, actuation systems 116 may include at least X-Y drive. Some actuation systems additionally include Z-axis and tilt drive. The controller 106 issues commands to the actuation drive controller 115, and the actuation drive controller 115 drives the actuation system 116 to position the nozzle 112 to scan the fluid jet 114 across the workpiece 102 to make cuts. The workpiece is supported by a workpiece support system 118.

The actuation system 116 may include a variety of motion mechanisms and/or may be used in other motion systems. For example, the actuation system 116 may include a friction drive, a belt drive, a chain drive, a cable drive, a rack and pinion drive, a lead screw or ball screw drive, a rolling ring drive, and/or a linear drive such as a linear stepper. The actuation system 116 may include different drive mechanisms in different axes.

Additionally, embodiments of the actuation system 116 and actuation drive controller 115 may be used for applications other than fluid jet cutting systems. For example, an actuation drive controller 115 and actuation system 116 including a brushless synchronous motor may be used to move an overhead crane. A pick-and-place machine, such as used in electronics manufacturing may include an actuation system including an actuation drive controller 115 and actuation system 116 using a brushless synchronous motor.

Generally, actuation systems 116 may be viewed as loosely coupled actuation systems where irregularities between commanded and actual motion may occur, or as closely coupled actuation systems where actual motion is closely correlated to commanded motion. An example of a loosely coupled actuation system 116 is a friction drive where wheel slippage and/or wear may cooperate to create some uncertainty in the relationship between commanded and actual motion.

Embodiments herein may be applied to either loosely coupled or closely coupled actuation systems.

Figure 2A:
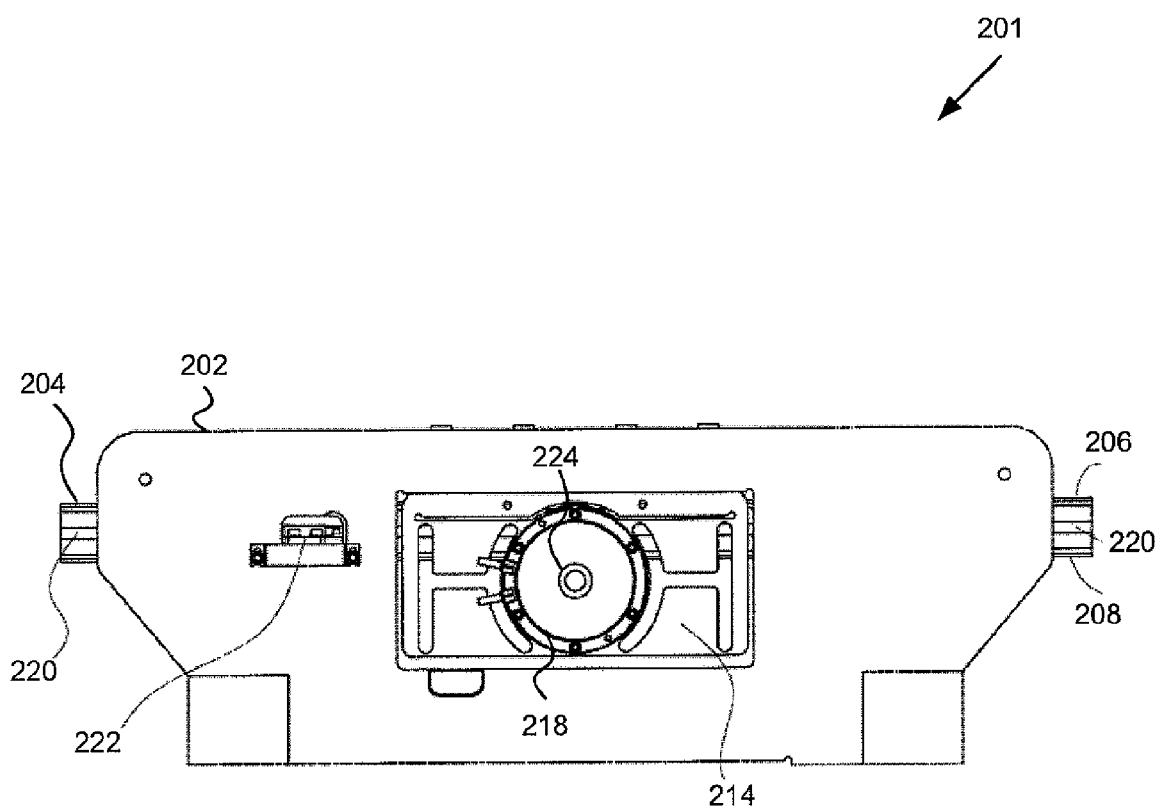
FIG. 2A is a front view of a friction drive actuation system, according to an embodiment.
Figure 2B:
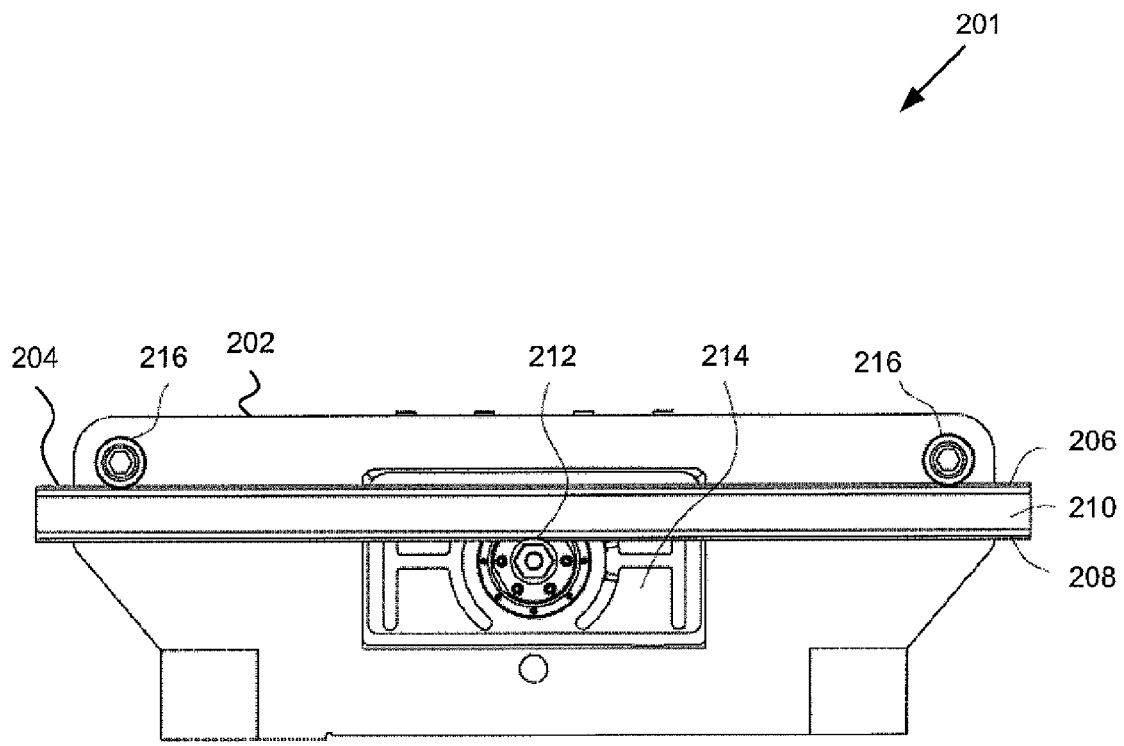
FIG. 2B is a back view of the friction drive actuation system of FIG. 2A, according to an embodiment.
Figure 2C:
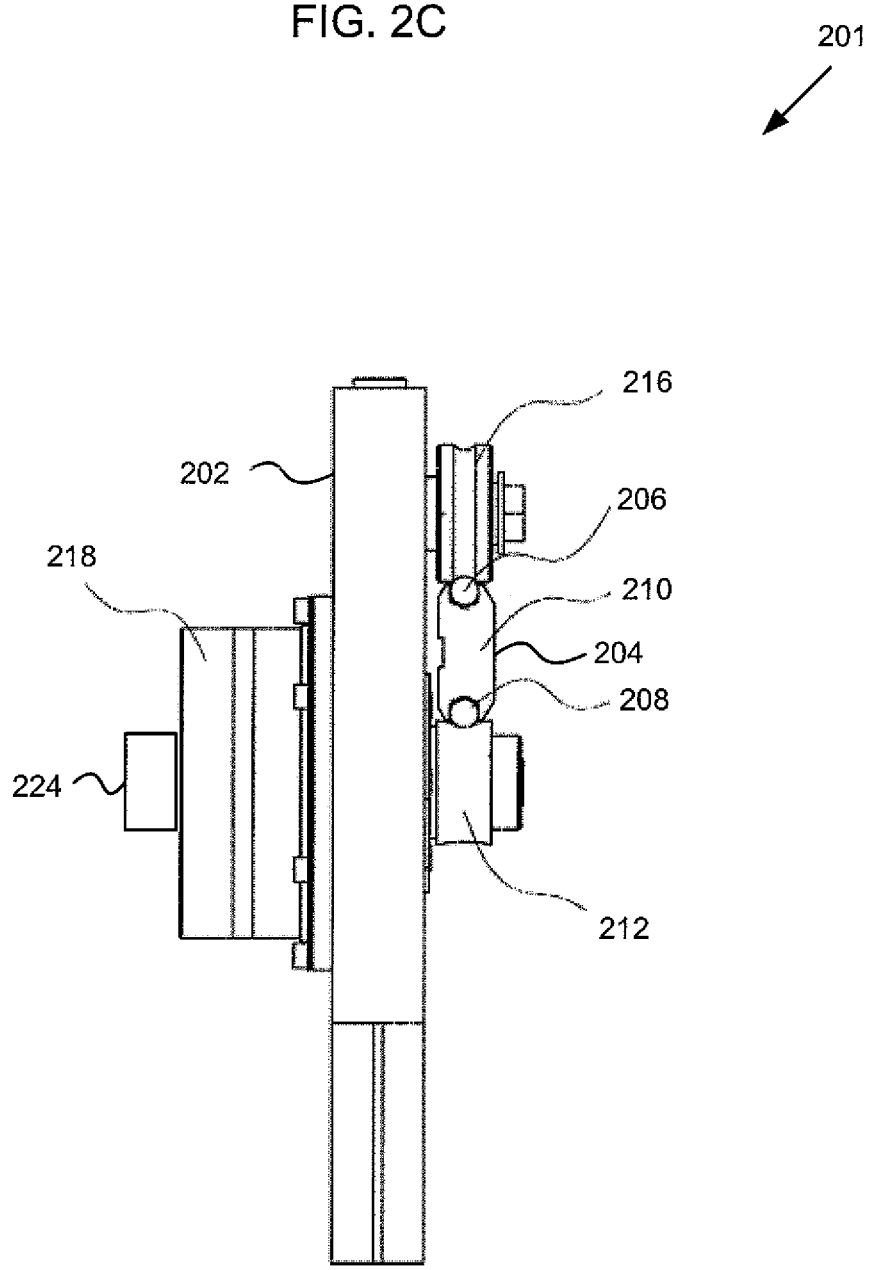
FIG. 2C is an end view of the friction drive actuation system of FIGS. 2A and 2B, according to an embodiment.

An example mechanism 201 of a friction drive actuation system 116 is shown in FIGS. 2A, 2B, and 2C, according to an embodiment. FIG. 2A is a front view of a friction drive mechanism 201, according to an embodiment. FIGS. 2B and 2C are, respectively, back and end views of the friction drive mechanism 201 of FIG. 2A. The friction drive mechanism 201 includes a carriage 202 configured to travel along a rail 204. The rail includes an upper hardened shaft 206 and a lower hardened shaft 208 supported by an aluminum frame 210. The aluminum frame 210 may be coupled, such as by bolting or welding, to the workpiece support system 118 shown diagrammatically in FIG. 1. Alternatively, the rail 204 may include a single hardened rail shaft.

A drive wheel 212 may be rotatably coupled to the carriage 202 and urged into position configured for friction coupling to the lower hardened rail shaft 208 by a spring plate 214. The outside diameter of the drive wheel 212 may optionally be radiused to match the radius of the lower hardened rail shaft 208. Optionally, the outside diameter of the drive wheel 212 may be shaped for one or more other purposes. A pair or more of track rollers 216 may be rotatably coupled to the carriage 202 and positioned to roll along the upper hardened shaft 206 in opposition to the drive wheel 212 and the spring force from the spring plate 214. The pair or more of track rollers 216 may further be configured to support the weight of the carriage 202, a cross-axis actuator (not shown), an angle actuator (not shown), the nozzle 112 of FIG. 1, and other associated hardware (not shown). The track rollers 216 may include a gothic arch shape on their outer diameters configured to match the radius of the upper hardened rail shaft 206.

According to an embodiment, the mechanism 201 may be mounted in an orientation inverted from that shown, such that the weight of the supported apparatus provides some or all of the force needed to hold the wheel 212 against the rail 204. Optionally, one or both of wheels 216 may be spring mounted to provide additional force.

A brushless synchronous motor 218 is configured to drive the drive wheel 212 in rotation relative to the carriage 202. Optionally, the output from the brushless synchronous motor 218 may be speed reduced, such as by a planetary gearbox, harmonic drive or other gearing system. Rotation by the brushless synchronous motor 218 is transmitted to the drive wheel 212 which rotates in a friction relationship against the lower hardened shaft 208 to translate the carriage 202 along the rail 204. Translation of the carriage 202 further causes the nozzle 112 to translate relative to the workpiece 102 (FIG. 1). When the fluid jet 114 is on, the fluid jet cuts the workpiece 102 along a path corresponding to movement of the carriage 202 along the rail 204.

As used herein, a brushless synchronous motor refers to a class of motors that may be driven in increments or steps or continuously, such as with sinusoidal current input. For example, embodiments may include a 3 phase brushless DC motor, a 2 phase stepper motor, a 5 phase stepper motor, a stepper motor, a switched reluctance motor, and/or a high pole count brushless synchronous motor.

Optionally, the brushless synchronous motor 218 may be equipped with a motor sensor 224. For example, the motor sensor may include a shaft-mounted encoder, a back EMF sensor, or a resolver configured to detect the position of the motor shaft. Typically, a motor sensor may be configured to detect shaft position and stator position relative to the motor windings to a relatively high degree of accuracy.

Referring to FIGS. 2A-2C, the rail 204 or other surface stationary with respect to the workpiece support system 118 may include a scale 220 such as a linear scale. The scale 220 may be formed as a series of transverse lines on a contrasting background. According to embodiments, the motor drive system 115 described herein may allow for a relatively coarse scale 220, and/or a relatively non-constant scale 220 while maintaining relatively fine nozzle 112 and jet 114 positioning accuracy. For example the scale 220 may include marks farther apart than the Nyquist sampling theorem would require for accurate feedback control (e.g. a minimum ratio of mark spacing to placement accuracy of less than about 2), in contrast to conventional servo-control systems for fluid jet actuators 116 that typically use 10× oversampling. According to an embodiment, the scale 220 may include marks having a sample frequency about equal to the placement accuracy of the nozzle. According to another embodiment, the scale 220 may include marks having a sample frequency about ¹⁄₁₀ the placement accuracy of the nozzle (10× undersampling). According to another embodiment, a sensor error map (described below) may allow use of a scale 220 having one or more missing marks or misplaced marks.

The scale 220 may for example include an aluminum, plastic, stainless steel or other strip including printed, embossed, etched, anodized, or otherwise marked gradations formed as lines running in a direction transverse to the direction of carriage 202 travel. An encoder 222 may be coupled to move with the carriage 202 and scan along the scale 220. For example, the scale encoder may include an optical detector, an emitter/detector pair, a magnetic pickup, a capacitive sensor, a linear CCD detector, a pulsed beam detector, a Vernier scale detector, or other apparatus configured to sense the apparent movement of linear scale 220 gradations relative to the position of the linear scale encoder 222 and the carriage 202. Alternatively, a position sensor may include a rotary encoder, an ultrasonic sensor, an interferometer, a triangulation or time-of-flight radio frequency sensor, a video camera, or other apparatus configured to sense position and/or movement of the carriage 202 without a corresponding scale 220. A sensor or encoder configured to detect movement of the carriage 202 (and therefore the nozzle 112 relative to the workpiece 102) may be referred to simply as a sensor. The sensor may interface to the motor drive 115 via a sensor port.

Figure 3:
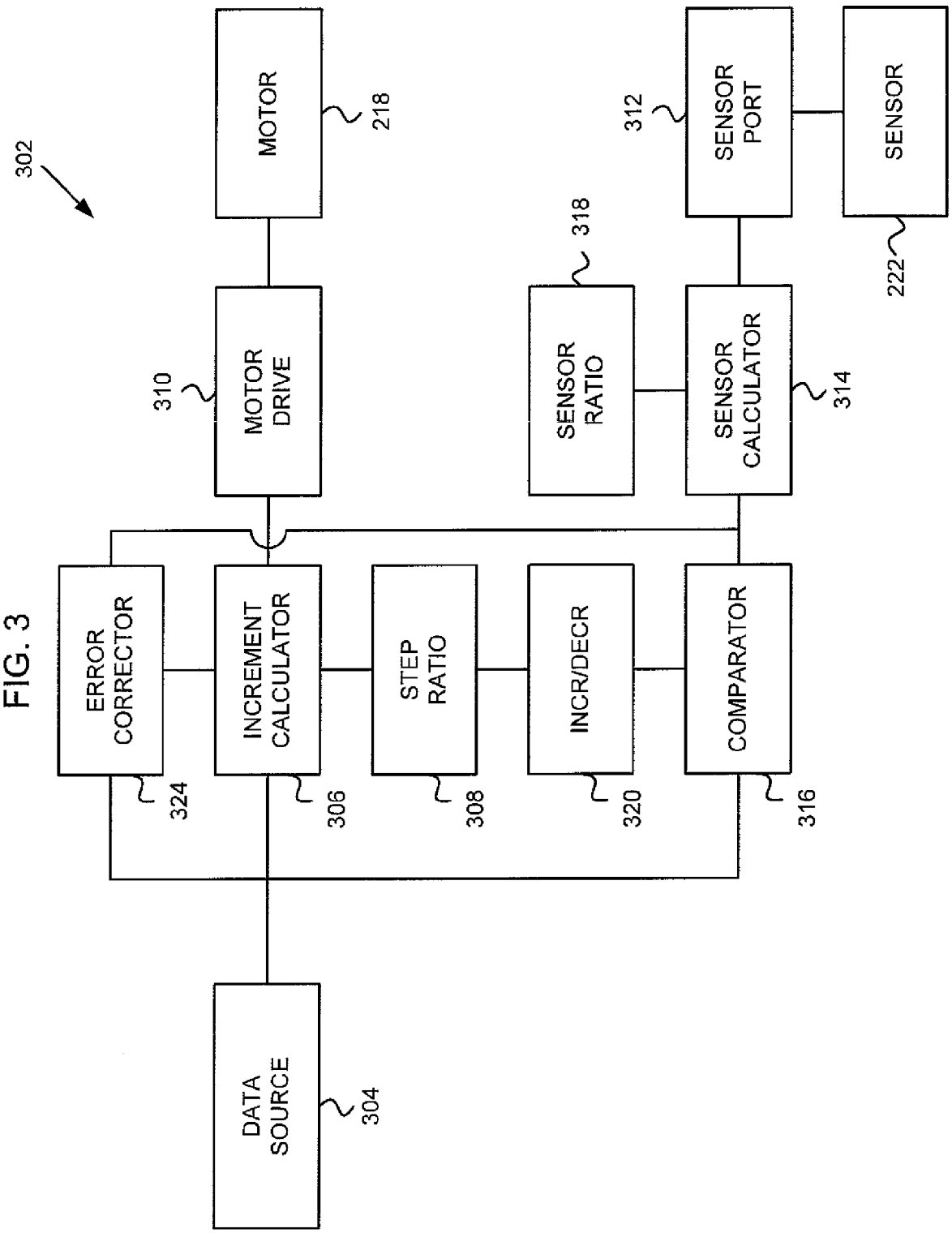
FIG. 3 is a block diagram of a circuit for driving a brushless synchronous motor, according to an embodiment.

FIG. 3 is a block diagram of a circuit 302 for driving a brushless synchronous motor 218, according to an embodiment. A data source 304 is configured to provide data corresponding to a desired travel distance or a number of command increments for driving the brushless synchronous motor 218. For example, the data source 304 may include a port configured for connection to the controller 106 of FIG. 1. Alternatively, the data source may include a tangible computer-readable medium carrying computer instructions for driving at least the actuator 116 and/or a user input control such as a keyboard, microphone, a joystick, and or computer pointing device, for example. The data source 304 may provide a number of command increments {CMD_INC} corresponding to an intended travel distance of the carriage 202 along the rail 204 shown in FIGS. 2A-2C.

An increment calculator 306 is configured to receive the number of command increments {CMD_INC} from the data source 304. The increment calculator 360 calculates a number of motor increments {MOT_INCR} as a function of the data {CMD_INC} from the data source 304 and data {MOT_PER_CMD} from a step ratio memory 308. For example, {MOT_INCR}={CMD_INC}×{MOT_PER_CMD}. The increment calculator 306 outputs motor increments {MOT_INCR} to a motor drive circuit 310. According to an embodiment, command increments {CMD_INC} may be received singly from the data source 304, in which case motor increments {MOT_INCR} may be calculated as {MOT_INCR}={MOT_PER_CMD}.

The motor drive circuit 310 includes circuitry for driving the brushless synchronous motor 218. The motor drive circuit 310 may include a step sequencer, such as for outputting a sequence of signals corresponding to full stepping, half stepping, super stepping, or micro stepping the brushless synchronous motor 218. The motor drive circuit 310 may also include driver circuits such latching drivers and amplifiers for providing an amplified drive signal to the brushless synchronous motor 218. As described above, according to an embodiment, a drive signal transmitted from the motor drive 310 to the brushless synchronous motor 218 may move a friction drive mechanism 201 along a track 204 to translate a fluid jet nozzle 112.

Data or a signal from a motion or distance sensor 222 may be received through a sensor port 312. As described above, the sensor port 314 may receive a signal or data from a linear scale encoder such as an optical emitter/detector pair, a magnetic pickup, a capacitive sensor, a linear CCD detector, a pulsed beam detector, a Vernier scale detector, or other apparatus configured to sense the apparent movement of linear scale 220 gradations relative to the position of the linear scale encoder 222 and the carriage 202. Alternatively, the sensor port 314 may receive a signal or data from a position or distance sensor such as a rotary encoder, an ultrasonic sensor, an interferometer, a triangulation or time-of-flight radio frequency sensor, a video camera, or other apparatus configured to sense position and/or movement of the carriage 202.

An optional sensor calculator 314 may convert the sensor signal or data from feedback units to an error value having units equivalent to {CMD_INC} units received from the data source 304. Alternatively, a data source calculator (not shown) may convert {CMD_INC} units received from the data source 304 into units equivalent to feedback units received by the sensor port. Alternatively, a sensor calculator 314 and a data source calculator (not shown) may convert the sensor units and the data source units {CMD_INC} into other units comparable to one another such as {MOT_INC} units. For example a sensor ratio memory 318 may hold a conversion value. The sensor calculator 314 may multiply a sensor value received from the sensor port 312 by the sensor ratio held in the sensor ratio memory and output the product to a comparator 316.

The sensor ratio memory may hold a value that is substantially fixed at system boot-up, or alternatively may be dynamic and/or hold a function corresponding to a systematic variation in intended travel distance to sensed travel distance. The value in the sensor ratio memory 318, the function in the sensor ratio memory, and/or a history of values in the sensor ratio memory 318 may be configured to compensate for variations in rail geometry, encoder variations vs. distance, mechanical defects in the scale, and/or other mechanical or electrical artifacts, for example.

The comparator 316 may be configured, for example, to compare an intended movement or position to a sensed movement or position. If the sensed movement is less than about equal to the intended movement, the comparator 316 drives an incrementer/decrementer 320 to increment the step ratio {MOT_PER_CMD} in the step ratio memory 308 such that the increment calculator 306 outputs more steps per {CMD_INC}. If the sensed movement is greater than about equal to the intended movement, the comparator 316 drives an incrementer/decrementer 320 to decrement the step ratio {MOT_PER_CMD} in the step ratio memory 308 such that the increment calculator 306 outputs fewer steps per {CMD_INC}.

Accordingly, the increment calculator 306 then calculates modified number of motor increments {MOT_INCR} as a function of the new data {MOT_PER_CMD} now held in the step ratio memory 308. The increment calculator 306 outputs a modified {MOT_INCR} to a motor drive 310 responsive to a given {CMD_INC} from the data source 304.

Optionally, the step ratio memory 308 may include a plurality of step ratios {MOT_PER_CMD} such as a look-up table or an algorithm that determines {MOT_PER_CMD} as a function of position. The incrementer/decrementer 320 may modify the function or look-up table as a function of linear position. A variable {MOT_PER_CMD} as a function of position may be regarded as a motor error map. The motor error map may anticipate future variations in apparent motor coupling vs. position just as a {MOT_PER_CMD} value that is constant vs. position may anticipate future global variations in apparent motor coupling. A value {MOT_PER_CMD} in the step ratio memory 308, a {MOT_PER_CMD} function in the step ratio memory 308, and/or a history of {MOT_PER_CMD} values in the step ratio memory 308 may be configured to compensate for variations in friction, variations in rail geometry, mechanical defects, motor phase distances, lead screw pitch variations, wear effects, and/or other mechanical artifacts, for example. According to embodiments, combinations of constant and variable contributions may make up a {MOT_PER_CMD} function.

The feed-forward control loop of FIG. 3 couples input movement commands to one or more motor drive signals as a function of an observed motor step vs. distance(s) relationship, optionally as a function of position.

Optionally, apparent slippage vs. distance or vs. ramp rate may be provided to the {CMD_INC} generator (e.g. the controller 106 of FIG. 1). The {CMD_INC} generator may optimize ramp sequences, plan tool paths responsive to mechanical effects, alert an operator, log performance, send a service alert, or perform other communications or processing responsive to feedback from the sensor.

The sensed travel distance or position from the sensor port 312 or the optional sensor calculator 314 may further be transmitted to an error corrector 324. The error corrector 324 may compare the intended travel distance or position, such as from the value {CMD_INC} received from the data source 304 to the sensed travel distance or position from the sensor port 312 or the optional sensor calculator 314 and determine a difference between intended and actual. The error corrector 324 may then issue data to the increment calculator 306, or optionally directly to the motor drive 310, to travel a distance sufficient to reach the intended distance or position. The error corrector 324 thus acts as a feedback loop that operates in tandem with the feed-forward loop described above.

The circuit 302 represented by the block diagram may include discrete hardware, integrated hardware, hardware/firmware, hardware/software, or hardware/firmware/software combinations. For example at least portions of the circuit 302 may be embodied as one or more state machines. Alternatively, the circuit 302 may include virtual elements configured as one or more software modules that run on an electronic device such as a programmable microcontroller or computer.

Figure 4:
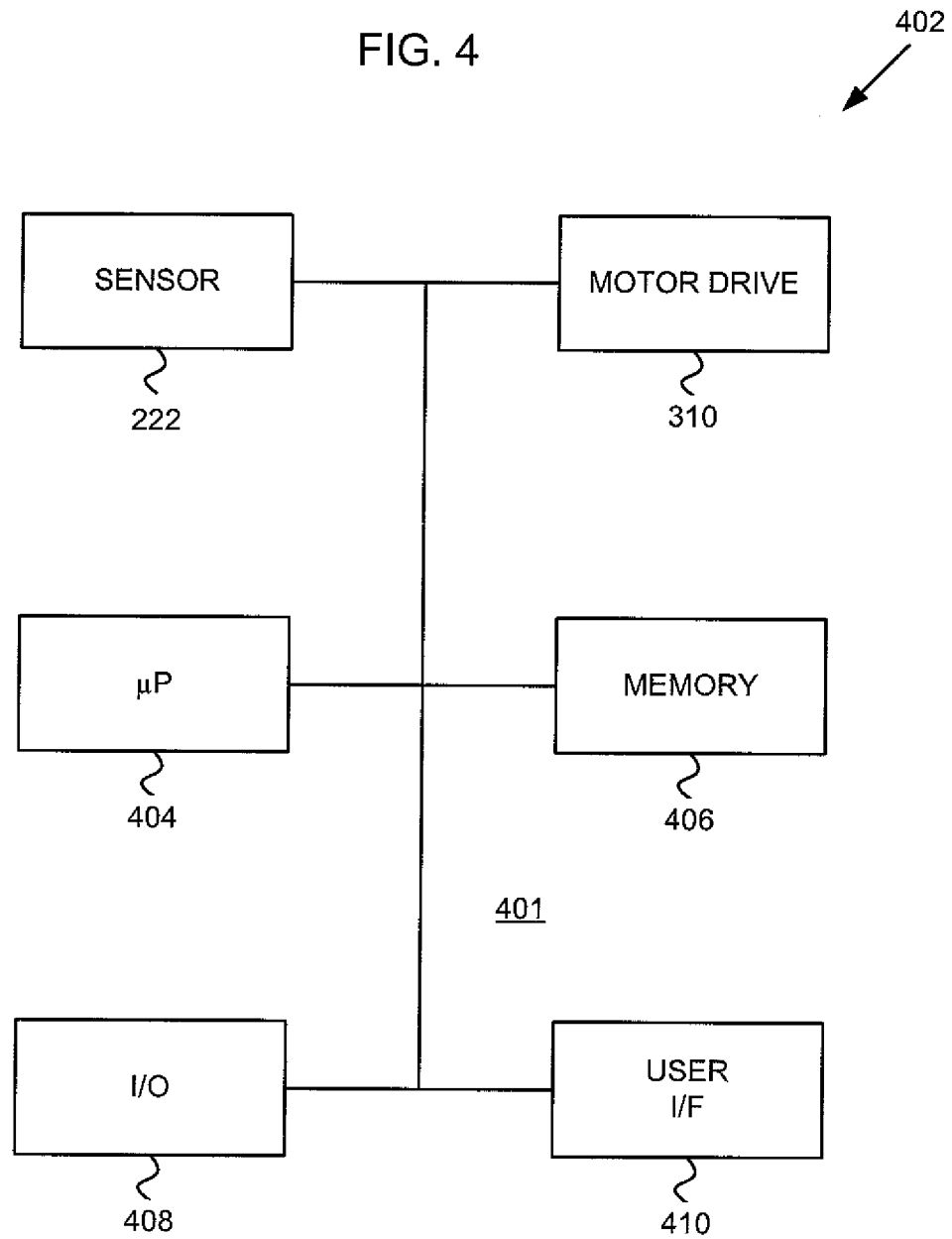
FIG. 4 is a block diagram of a motor drive embodied as a programmable microcontroller, according to an embodiment.

FIG. 4 is a block diagram 401 of a motor drive 115 embodied as a programmable microcontroller 402 configured to execute methods disclosed herein. The microcontroller 402 may include a microprocessor 404, memory 406, one or more input ports 408, one or more sensor ports 410, one or more output ports 412, and, optionally, a human interface 414. Optionally, the microcontroller 402 may include one or more lower level logic devices such as a gate array, a field-programmable gate array (FPGA), an ASIC, a standard cell device, programmable array logic (PAL), a discrete transistor circuit, and/or other conventional devices (not shown).

Figure 5:
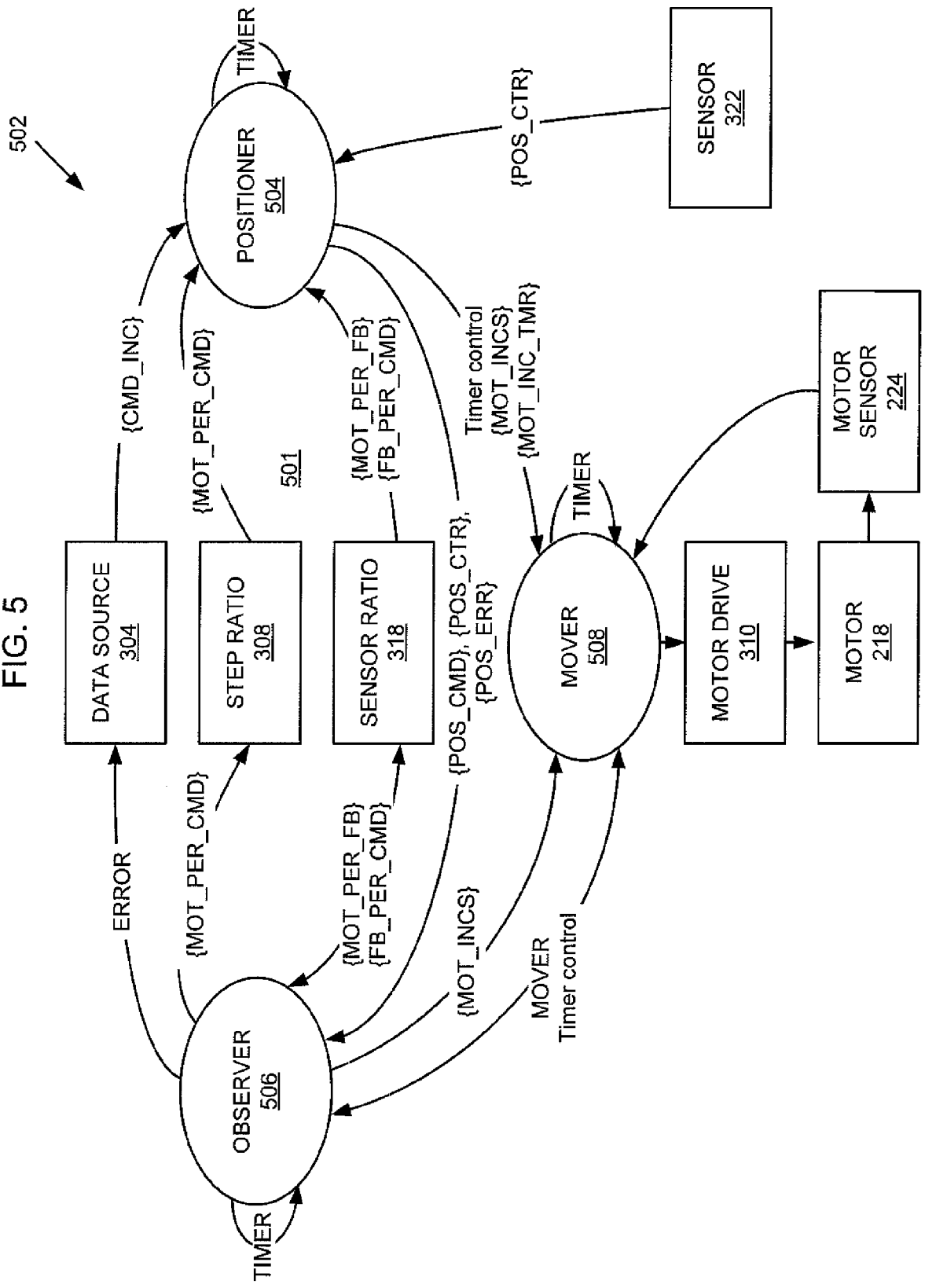
FIG. 5 is a state diagram of a program for driving a brushless synchronous motor, according to an embodiment.

FIG. 5 is a state diagram 501 illustrating a process 502 for managing step commands to a brushless synchronous motor. The state diagram 501 shows several related tasks run by a control circuit such as the circuit 402 of FIG. 4.

A POSITIONER task 504 runs each time an incremental command {CMD_INC} is received by the control circuit 402 from a data source 304 such as the controller 106. For each incremental command {CMD_INC} received, the POSITIONER 504 determines the elapsed time since the last incremental command and stores the elapsed time as {CMD_TIME}.

The POSITIONER 504 determines positioning error {POS_ERR} remaining in the system as:
 {POS_ERR}={POS_CTR}−{POS_CMD};
where:
 The position error {POS_ERR} is a number of feedback increments the carriage is away from the intended position;
 a position counter value {POS_CTR} is a number of sensed increments received from a sensor 322; and
 a position command value {POS_CMD} is an intended travel distance in feedback units converted from command increments according to the relationship:
 {POS_CMD}={POS_CMD}±{FB_PER_CMD}×{CMD_INC};
where:
 {FB_PER_CMD} is number of feedback increments per command increment {CMD_INC}.

According to an embodiment, the number of feedback units per command increment {FB_PER_CMD} may be constant. The value {FB_PER_CMD} may be set in a sensor ratio memory 318 at power-up and not change during operation. According to another embodiment, such as in cases where spacing between marks on the linear scale 220 (FIG. 2A) are not constant or where marks are missing, the number of feedback units per command increment {FB_PER_CMD} may be variable. In such a case the number of feedback units per command increment {FB_PER_CMD} may be received dynamically from a sensor map 318 including {FB_PER_CMD} values that are a function of position.

According to an embodiment, the position error {POS_ERR} determined according to the equation {POS_ERR}={POS_CTR}−{POS_CMD} may be determined once per single command increment {CMD_INC}=1. In such case the position command value {POS_CMD}, equal to the intended travel distance in sensor units, may be updated according to the relationship {POS_CMD}={POS_CMD}±{FB_PER_CMD}, since the {FB_PER_CMD} multiplier is unity.

The POSITIONER 504 also determines the number of motor increments {MOT_INCS} to be sent to the MOVER 508 according to the relationship:
 {MOT_INCS}=±{MOT_PER_CMD}×{CMD_INC}
  ±{POS_ERR}×{MOT_PER_FB}
where:
 {MOT_INCS} is the number of motor increments sent to the motor driver.
 {MOT_PER_CMD} is the number of motor increments per command increment. As described below, the value of {MOT_PER_CMD} may be modified by the OBSERVER 506.
 {MOT_PER_FB} is the ratio of motor increments per feedback increment. As described below, the value of {MOT_PER_FB} may also be modified by the OBSERVER 506.

The POSITIONER 504 also determines the motor increment interval {MOT_INC_TMR}, the time to elapse between sending motor increments {MOT_INCS} to the motor driver 310 according to the relationship:
 {MOT_INC_TMR}={CMD_TIME}/{MOT_INCS}
where:
 {MOT_INC_TMR} is the time to wait between sending motor increments.
 {CMD_TIME} is the elapsed time since the last incremental command {CMD_INC} received from the data source 304.
 {MOT_INCS} is the number of motor increments to be sent to the motor driver.

The POSITIONER 504 may determine alternate actions depending on the value of the position error {POS_ERR}. For small values of position error {POS_ERR}, the POSITIONER 504 may compensate for the error by adding extra motor increments {MOT_INCS} to the subsequent move. For example, the POSITIONER may determine motor increments {MOT_INCS} according to the relationship:
 {MOT_INCS}=±{MOT_PER_CMD}×{CMD_INC}
  ±{POS_ERR}×{MOT_PER_FB}
rather than simply:
 {MOT_INCS}=±{MOT_PER_CMD}×{CMD_INC};
wherein the term {MOT_INCS}={POS_ERR}×{MOT_PER_FB} is the residual error from the previous move.

According to an embodiment, if the value of {POS_ERR} is larger than a first limit, only an allowed additional movement will be made and some residual error may remain.

According to embodiments, if a relatively large residual error occurs (greater than the first limit), the POSITIONER 504 or the OBSERVER 506 may slowly drive the motor to remove the error.

According to an embodiment, if the value of {POS_ERR} is larger than a second limit, the POSITIONER 504 or the OBSERVER 506 may send an error signal indicative of the position error exceeding the second limit.

The POSITIONER 504 sends the number of motor increments {MOT_INCS} and the motor increment interval {MOT_INC_TMR} to the MOVER 508. To force the MOVER 508 to start running substantially immediately, the POSITIONER 504 may enable the MOVER 508 timer and set it to expire substantially immediately. The POSITIONER 504 may start and stop the MOVER timer.

The MOVER 508 may interact in substantially real time with the motor driver 310 to drive the brushless synchronous motor. The MOVER 508 receives the number or motor increments {MOT_INCS} and the elapsed time {MOT_INC_TMR} between motor increments from the POSITIONER 504. The MOVER 508 may execute the following functions:
 1. Wait for the MOVER timer to expire.
 2. Send an incremental step to the motor driver.
 3. Decrement the {MOT_INCS} variable.
 4. If {MOT_INCS}=0, turn the timer off.
 5. Set the timer to {MOT_INC_TMR}.
 6. Set the motor increments to the next value {MOT_INCS}={MOT_INCS}.

Optionally, the brushless synchronous motor 218 may be equipped with a motor sensor 224. For example, the motor sensor may include an encoder, a back EMF sensor, or a resolver configured to detect the position of the motor shaft. Typically, a motor sensor may be configured to detect shaft position and stator position relative to the motor windings to a relatively high degree of accuracy. A signal from the motor sensor 224 may be read by the MOVER 508. The MOVER 508 may output step commands responsive to the signal from the motor sensor 224 in addition to data received from the POSITIONER 504 and the OBSERVER 506.

For example, a motor sensor may be configured to determine stator position to a precision of 50 increments per step. This information may be used, for example to maintain a constant angle between winding energization and the stator, and thus maintain a more constant torque on the brushless synchronous motor 224 and reduce "notchiness." An example of a commercially available motor sensor system is ALPHASTEP™ available from ORIENTAL MOTOR. The MOVER 508 may output step commands to the MOTOR DRIVE 310 to microstep the brushless synchronous motor 218 through 50 microsteps per full step. Responsive to feedback from the motor sensor 224, the MOVER 508 may send one or more signals to the motor drive circuit 310 to output microsteps to the brushless synchronous motor 218 with timing determined according to stator angle.

For example, the MOVER 508 may drive the motor drive circuit 310 to quickly output some number of microsteps to the brushless synchronous motor 218 sufficient to overcome static friction and/or field strength during a portion of a step, output another number of microsteps during a second portion of the step at a slower rate, and then quickly output a number of microsteps in the opposite direction during a third portion of the step to decelerate the brushless synchronous motor 218 and resist pull-in by high field strength. Use of motor sensor 224 feedback by the MOVER may thus reduce uneven and/or discontinuous motor rotation and carriage translation velocity.

According to an embodiment, the OBSERVER measures errors compared to intended movements, sends commands the MOVER 508 to compensate for the errors, and modifies the step ratio 308 {MOT_PER_CMD} and a values stored in the sensor ratio 318 {MOT_PER_FB} to reduce future errors. The OBSERVER 506 may have a dedicated OBSERVER timer. When the OBSERVER timer expires, the OBSERVER 506 runs. According to an embodiment, the OBSERVER timer always runs.

The OBSERVER 506 receives the position command value {POS_CMD} (corresponding to the command increment {CMD_INC} in feedback units), the position error in feedback units {POS_ERR}, and the position counter value {POS_CTR} from the POSITIONER 504. The OBSERVER 506 may execute the following functions:
1. Wait for timer to expire
2. If {POS_ERR}>{FB_PER_CMD}, adjust {MOT_PER_CMD} and {MOT_PER_FB}.
3. If {POS_ERR}>{FB_PER_CMD}, increment {MOT_INCS} and ensure that the MOVER timer is running.
4. Calculate observed error according to the relationship:
 {OBS_ERR}={POS_CTR}-{POS_CMD}
5. If {OBS_ERR}>J×{FB_PER_CMD}, send an error signal to the data source 304 such as the controller 106 (FIG. 1).
6. Reset OBSERVER timer.

The OBSERVER process may run substantially continuously. For example the OBSERVER timer may be reset to make the OBSERVER process run each 1 msec. In step 5, in the relationship {OBS_ERR}>J×{FB_PER_CMD}, J may be chosen according to system characteristics. According to an embodiment, J may be 50. According to other embodiments, J may be 100 or 500, for example. Generally, J may be chosen to be a high enough value that an error condition is not reached absent some fault, but low enough that a fault is detected relatively quickly.

According to embodiments, the amount of change made by the OBSERVER 506 to {MOT_PER_CMD} and {FB_PER_CMD} may vary according to various logical tests. For example, logic for changing {MOT_PER_CMD} and {FB_PER_CMD} may include decreased gain near {OBS_ERR}=0 values (such as to reduce "hunting") and/or varying the change dependent upon {OBS_ERR} history, and/or {OBS_ERR} range limits (such as to detect a jamb or other transient effect). According to an embodiment, modification to the {MOT_PER_CMD} value in the step ratio memory 308 may be a function of, such as proportional to, an {OBS_ERR} value. According to another embodiment, modification to the {MOT_PER_CMD} value in the step ratio memory 322 may be independent of an {OBS_ERR} value. According to an embodiment, the {MOT_PER_CMD} value may be incremented or decremented by a constant value responsive to a non-zero {OBS_ERR} value.

Typically, the OBSERVER 506 may increment or decrement {MOT_PER_CMD} by a relatively small value per cycle. The increment or decrement value may be fixed or variable. For example, the increment may be configured to change the value of {MOT_PER_CMD} by about 0.1%. Cycle periods may for example be about a second, 100 mS, 10 mS, 1 mS, 100 μS, or other periods. Shorter cycle periods may tend to cause more gain in the system, such as to modify {MOT_PER_CMD} dynamically along a range of travel or segment of a range of travel. Longer cycle periods may be more appropriate for modifying {MOT_PER_CMD} only responsive to longer term effects such as wear.

Embodiments of processes described in conjunction with FIGS. 3-5 may alternatively be viewed in terms of a process 601 described by a flow chart shown in FIG. 6. Beginning at step 602, a command increment {CMD_INC} value is read from the data source 304. Proceeding to step 604, the {CMD_INC} value is multiplied by the current {MOT_PER_CMD} value to determine a value for {MOT_INCS} 606 according to the relationship:
 {MOT_INCS}={CMD_INC}×{MOT_PER_CMD}.

Steps corresponding to {MOT_INCS} are sent to the motor drive 310 to move the brushless synchronous motor a corresponding number of motor steps. The motor drive 310 may include a step sequencer and one or more amplifiers to drive the motor phases. Steps 602 and/or 604 may further include determining one or more step intervals (not shown) corresponding to a motor speed corresponding to one or more rates at which the motor phases are driven.

Beginning at step 608, feedback data {POS_CTR} is read from a sensor port 312 operatively coupled to a sensor 322. The sensor port may be a node on a circuit or may include a physical or wireless connection to which a sensor 322 is operatively coupled. The {POS_CTR} value read from the sensor corresponds to an observed number of feedback units that the brushless synchronous motor drives a first member such as the carriage 220 shown in FIGS. 2A-2C relative to a second member such as the rail 204.

Proceeding to step 610 the {POS_CTR} value in feedback units is converted to motor increment units by reading the current value of {MOT_PER_FB} from the sensor ratio memory 318, and multiplying {POS_CTR} by the current value of {MOT_PER_FB} to produce a value {MOT_FB} corresponding to the observed movement in motor increment units. Step 610 determines the value of {MOT_FB} according to the relationship:
 {MOT_FB}={POS_CTR}×{MOT_PER_FB}.

Proceeding to optional step 611, a test is performed to see if the {MOT_INCS} value 606 received from step 604 is equal or about equal to the {MOT_FB} value received from step 610. If the values are equal or about equal, the process loops from step 611 back to step 608 where the {POS_CTR} value is again read from the sensor port 312 and the sensor 322.

If the value of {MOT_INCS} is not about equal to {MOT_FB}, then the process proceeds from step 611 to step 612. In step 612 the values or functions {MOT_PER_CMD} and {MOT_PER_FB} are modified to compensate for the difference between intended motor increments {MOT_INCS} and observed motor increments {MOT_FB} according to the relationships:

If {MOT_INCS}>{MOT_FB};
then {MOT_PER_CMD}={MOT_PER_CMD}−M
and {MOT_PER_FB}={MOT_PER_FB}−N.
If {MOT_INCS}<{MOT_FB};
then {MOT_PER_CMD}={MOT_PER_CMD}+M
and {MOT_PER_FB}={MOT_PER_FB}+N.

The new values or functions of {MOT_PER_CMD} and {MOT_PER_FB} are then respectively written to the step ratio memory 308 and the sensor ratio memory 318, and the process loops back to step 608. Optionally, the data source 304 may read from and/or write to the step ratio memory 308 and/or the sensor ratio memory 318.

The values for M and N may be static or dynamic. For example, the value for M may be selected to produce an 0.1% change in the calculated value for {MOT_INCS}. The value for N may be selected to maintain the ratios between {CMD_INC}, {MOT_INCS}, and {POS_CTR}. For example, the value of N may be chosen to maintain the relationship:

{MOT_PER_FB}={FB_PER_CMD}×{MOT_PER_CMD}.

Comparing aspects of the processes described in conjunction with FIGS. 3, 5, and 6, one can see that the actual movement of the driven member may be compared to intended movement in several units. FIG. 3 illustrates comparing intended to actual travel in {CMD_INC} units, the units received from the data source 304. FIG. 5 illustrates comparing intended to actual travel in {POS_CTR} units, the units received from the sensor 322 through the sensor port 312. FIG. 6 illustrates comparing intended to actual travel in {MOT_INC} units, the units delivered to the motor drive 310. Other transformations and/or bases for comparison may similarly fall within the scope of the claims.

While linear movement or travel, for example the linear travel of a carriage 220 along a rail 204, has been used as an illustrative embodiment; other movement or travel driven by a brushless synchronous motor may similarly benefit from embodiments taught herein and may fall within the scope of the claims. For example, curvilinear motion, rotary motion, reciprocating motion, vibrational motion, and/or other motion driven by a brushless synchronous motor may be substituted for linear motion, according to various embodiments.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for driving a brushless synchronous motor, the method comprising:
receiving at least one command through a data interface to move a number of command increments corresponding to a travel distance of a member driven by a brushless synchronous motor;
determining a ratio of motor increments per command increment;
calculating from the ratio a number of motor increments corresponding to the number of command increments;
outputting the calculated number of motor increments to the brushless synchronous motor;
monitoring a position encoder operatively coupled to the member driven by the brushless synchronous motor; and
changing the ratio of motor increments per command increment if the position encoder indicates an error from an expected change in position.

2. The method for driving a brushless synchronous motor of claim 1, further comprising driving the member via a friction drive mechanism.

3. The method for driving a brushless synchronous motor of claim 1, further comprising driving an apparatus including a fluid jet nozzle relative to a work piece via a friction drive mechanism.

4. The method for driving a brushless synchronous motor of claim 1, wherein the motor increments include at least one of single steps, half steps, micro steps, or super steps.

5. The method for driving a brushless synchronous motor of claim 1, wherein:
the member driven by the brushless synchronous motor is driven to a positional accuracy; and
the position encoder has less than ten times a position resolution than the positional accuracy of the member.

6. The method for driving a brushless synchronous motor of claim 1, wherein:
the member driven by the brushless synchronous motor is driven to a positional accuracy; and
the position encoder has a lower position resolution than the positional accuracy of the member.

7. The method for driving a brushless synchronous motor of claim 1, further comprising:
calculating a position error; and
outputting motor increments to the brushless synchronous motor to correct the position error.

8. The method for driving a brushless synchronous motor of claim 7, wherein said changing the ratio of motor increments per command increment occurs after said calculating the position error.

9. The method for driving a brushless synchronous motor of claim 8, further comprising:
calculating from the changed ratio a number of motor increments to correct the position error; and
wherein said outputting motor increments to the brushless synchronous motor to correct the position error includes outputting motor increments calculated from the changed ratio.

10. The method for driving a brushless synchronous motor of claim 1, further comprising driving the member via at least one of a friction drive mechanism, a belt drive mechanism, a chain drive mechanism, a cable drive mechanism, a rack and pinion drive mechanism, a lead screw drive mechanism, a ball screw drive mechanism, a rolling ring drive mechanism, or a linear drive mechanism.

11. The method for driving a brushless synchronous motor of claim 1, wherein said calculating the number of motor increments includes calculating the number of motor increments from a plurality of ratios over a change in position.

12. The method for driving a brushless synchronous motor of claim 1, wherein said monitoring the position encoder includes monitoring a linear encoder or a rotary encoder.

13. A method for driving a brushless synchronous motor, the method comprising:

receiving at least one command through a data interface to move a number of command increments;
determining a ratio of motor increments per command increment;
calculating from the ratio a number of motor increments corresponding to the number of command increments;
outputting the calculated number of motor increments to a brushless synchronous motor;
monitoring a position encoder operatively coupled to a member driven by the brushless synchronous motor;
updating the ratio of motor increments per command increment if the position encoder indicates an error from an expected change in position; and
driving an apparatus including a fluid-jet nozzle relative to a work piece via a friction drive mechanism, wherein the apparatus including the fluid-jet nozzle includes a carriage driven along at least one rail by a friction wheel operatively coupled to the brushless synchronous motor; and
wherein said monitoring the position encoder includes detecting a plurality of marks along a linear scale coupled to the at least one rail with a detector operatively coupled to the carriage.

14. A method for driving a brushless synchronous motor, the method comprising:
receiving at least one command through a data interface to move a number of command increments;
determining a ratio of motor increments per command increment;
calculating from the ratio a number of motor increments corresponding to the number of command increments;
outputting the calculated number of motor increments to a brushless synchronous motor;
monitoring a position encoder operatively coupled to a member driven by the brushless synchronous motor; and
modifying the ratio of motor increments per command increment if the position encoder indicates an error from an expected change in position, wherein said updating the ratio of motor increments per command increment if the position encoder indicates the error from the expected change in position includes dynamically modifying the ratio of motor increments per command increment while outputting motor increments to the brushless synchronous motor.

15. The method for driving a brushless synchronous motor of claim 14, further comprising:
recalculating from the modified ratio a number of motor increments corresponding to the number of command increments; and
outputting the recalculated number of motor increments to the brushless synchronous motor rather than the calculated number of motor increments.

16. A method for driving a brushless synchronous motor, the method comprising:
receiving at least one command through a data interface to move a number of command increments;
determining a ratio of motor increments per command increment;
calculating from the ratio a number of motor increments corresponding to the number of command increments;
outputting the calculated number of motor increments to a brushless synchronous motor;
monitoring a position encoder operatively coupled to a member driven by the brushless synchronous motor;
updating the ratio of motor increments per command increment if the position encoder indicates an error from an expected change in position;

receiving position errors or recalculated ratios of motor increment per command increment corresponding to a plurality of segments within a range of travel; and
determining an error or ratio map corresponding to the plurality of segments.

17. The method for driving a brushless synchronous motor of claim 16, further comprising:
reading at least a portion of the error or ratio map; and
wherein said determining the ratio includes determining at least one ratio corresponding to the portion of the error or ratio map.

18. A circuit to drive a brushless synchronous motor, the circuit comprising:
a data source configured to provide data corresponding to a programmed travel distance of a member driven by a brushless synchronous motor or to a number of command increments corresponding to the programmed travel distance of the member driven by the brushless synchronous motor;
a step-ratio memory configured to hold data corresponding to a ratio of motor increments per unit distance or to a ratio of motor increments per command increment;
an increment calculator configured to calculate a number of motor increments as a function of the data from the data source and the data from the step-ratio memory;
a motor drive port configured to output the calculated number of motor increments;
a position encoder configured to indicate an actual travel distance of the member; and
a step-ratio adjuster configured to alter the data corresponding to the ratio of motor increments per unit distance or to the ratio of motor increments per command increment if the actual travel distance differs from the programmed travel distance.

19. The circuit to drive a brushless synchronous motor of claim 18, wherein the step-ratio memory is configured to hold a step-error map corresponding to one or more variations in the actual travel distance versus the programmed travel distance as a function of position.

20. The circuit to drive a brushless synchronous motor of claim 18, further comprising a step sequencer operatively coupled to the motor drive port.

21. The circuit to drive a brushless synchronous motor of claim 20, wherein the step sequencer is configured to output a sequence of steps to the brushless synchronous motor to step the motor in at least one of full steps, half steps, super steps, or micro steps.

22. A circuit to drive a brushless synchronous motor, the circuit comprising:
a data source configured to provide data corresponding to a travel distance of a member driven by a brushless synchronous motor or to a number of command increments corresponding to the travel distance of the member driven by the brushless synchronous motor;
a step-ratio memory configured to hold data corresponding to a ratio of motor increments per unit distance or to a ratio of motor increments per command increment;
an increment calculator configured to calculate a number of motor increments as a function of the data from the data source and the data from the step ratio memory;
a motor-drive port configured to output the calculated number of motor increments;
a sensor port configured to receive sensor input corresponding to an actual travel distance of the member driven by the brushless synchronous motor;

a comparator circuit configured to compare the actual travel distance to the travel distance or actual command increments to the command increments and output error data; and an increment/decrement circuit configured to increment or decrement the data in the step-ratio memory as a function of the outputted error data.

23. The circuit to drive a brushless synchronous motor of claim 22, further comprising a feedback circuit configured to determine a difference between the travel distance and the actual travel distance.

24. The circuit to drive a brushless synchronous motor of claim 22, wherein the feedback circuit includes a sensor-error memory configured to hold a variation in sensor output versus travel distance.

25. The circuit to drive a brushless synchronous motor of claim 22, wherein the comparator circuit is configured to compare the actual travel distance versus the travel distance in units of distance, units of command increments, units of motor increments, or feedback units.

26. The circuit to drive a brushless synchronous motor of claim 22, further comprising:

a sensor operatively coupled to the sensor port; and the brushless synchronous motor, which is operatively coupled to the motor drive port.

27. A tangible, non-transitory computer-readable medium carrying computer instructions configured to cause a computer to:

receive a command increment value corresponding to a travel distance of a member driven by a brushless synchronous motor;

calculate a first motor increment value from the command increment value and a step ratio;

drive, with the motor, a motor drive operatively coupled to the member according to the first motor increment value;

observe the first motor increment value and a feedback value corresponding to actual movement of the member produced by the brushless synchronous motor;

determine whether the motor increment value differs from the feedback value; and when the motor increment value differs from the feedback value, modify the step ratio responsive to the difference between the first motor increment value and the feedback value.

28. The tangible, non-transitory computer-readable medium of claim 27, wherein the computer instructions are further configured to cause the computer to:

determine a position error; and drive the motor drive with the motor according to a second motor increment value corresponding to the position error.

29. The tangible, non-transitory computer-readable medium of claim 27, wherein the computer instructions are further configured to cause the computer to:

determine an interval between motor increments; and wherein said driving the motor drive includes waiting the interval between transmitting step commands.

30. The tangible, non-transitory computer-readable medium of claim 27, wherein the computer instructions are further configured to cause the computer to transmit an error message if the difference between the motor increment value and the feedback value is greater than a limit.

31. A method for driving a brushless synchronous motor, the method comprising:

receiving a command increment value corresponding to a travel distance of a member driven by a brushless synchronous motor;

calculating a motor increment value from the command increment value and a step ratio;

driving, with the motor, a motor drive operatively coupled to the member according to the motor increment value;

observing the motor increment value and a feedback value corresponding to actual movement of the member produced by the brushless synchronous motor;

determining whether the motor increment value differs from the feedback value; and when the motor increment value differs from the feedback value, adjusting the step ratio responsive to the difference between the motor increment value and the feedback value.

32. The method for driving a brushless synchronous motor of claim 31, further comprising:

determining a position error; and driving the motor drive with the motor according to a second motor increment value corresponding to the position error.

33. The method for driving a brushless synchronous motor of claim 31, further comprising:

determining an interval between motor increments; and wherein said driving the motor drive includes waiting the interval between transmitting step commands.

34. The method for driving a brushless synchronous motor of claim 31, further comprising transmitting an error message if the difference between the motor increment value and the feedback value is greater than a limit.

* * * * *